United States Patent
Tijssen et al.

(10) Patent No.: US 11,597,197 B2
(45) Date of Patent: Mar. 7, 2023

(54) METHOD FOR PRODUCING POLYMER COATED STEEL SHEET FOR 3-PIECE CANS AND USE THEREOF

(71) Applicant: TATA STEEL IJMUIDEN B.V., Velsen-Noord (NL)

(72) Inventors: Geertruida Cornelia Tijssen, Alkmaar (NL); Jan Paul Penning, The Hague (NL)

(73) Assignee: TATA STEEL IJMUIDEN B.V., Velsen-Noord (NL)

( * ) Notice: Subject to any disclaimer, the term of this patent is extended or adjusted under 35 U.S.C. 154(b) by 356 days.

(21) Appl. No.: 16/755,968

(22) PCT Filed: Dec. 4, 2018

(86) PCT No.: PCT/EP2018/083547
§ 371 (c)(1),
(2) Date: Apr. 14, 2020

(87) PCT Pub. No.: WO2019/110616
PCT Pub. Date: Jun. 13, 2019

(65) Prior Publication Data
US 2021/0237420 A1    Aug. 5, 2021

(30) Foreign Application Priority Data
Dec. 5, 2017 (EP) .................................... 17205570

(51) Int. Cl.
*B32B 37/00* (2006.01)
*B32B 37/20* (2006.01)
(Continued)

(52) U.S. Cl.
CPC ........ *B32B 37/203* (2013.01); *B29C 48/0022* (2019.02); *B29C 48/08* (2019.02);
(Continued)

(58) Field of Classification Search
CPC ....... B32B 37/203; B32B 3/14; B32B 15/085; B32B 15/088; B32B 15/09; B32B 15/18;
(Continued)

(56) References Cited

U.S. PATENT DOCUMENTS 5,236,533 A * 8/1993 Imai ...................... B05C 1/0834
156/244.11
5,407,702 A * 4/1995 Smith ...................... B05D 1/28
427/209
(Continued)

FOREIGN PATENT DOCUMENTS

FR   2638429 A1 *  5/1990  ............. B32B 27/36
GB   2265568 A      10/1993
(Continued)

OTHER PUBLICATIONS

English machine translation of FR 2638429 A1 to Matsui; May 1990; 7 pages. (Year: 1990).*
(Continued)

*Primary Examiner* — Linda L Gray
(74) *Attorney, Agent, or Firm* — Vorys, Sater, Seymour and Pease LLP

(57) ABSTRACT

A method for producing polymer coated steel sheet for 3-piece cans and 3-piece cans produced thereof.

11 Claims, 5 Drawing Sheets

(51) Int. Cl.
  *B32B 38/00*   (2006.01)
  *B32B 38/04*   (2006.01)
  *B32B 3/14*    (2006.01)
  *B32B 15/085*  (2006.01)
  *B32B 15/088*  (2006.01)
  *B32B 15/09*   (2006.01)
  *B32B 15/18*   (2006.01)
  *B29C 48/00*   (2019.01)
  *B29C 48/08*   (2019.01)
  *B29K 101/12*  (2006.01)
  *B29L 7/00*    (2006.01)

(52) U.S. Cl.
  CPC .............. *B32B 3/14* (2013.01); *B32B 15/085* (2013.01); *B32B 15/088* (2013.01); *B32B 15/09* (2013.01); *B32B 15/18* (2013.01); *B32B 37/085* (2013.01); *B32B 38/0036* (2013.01); *B32B 38/04* (2013.01); *B32B 38/105* (2013.01); *B29K 2101/12* (2013.01); *B29L 2007/008* (2013.01); *B32B 2038/045* (2013.01); *B32B 2307/752* (2013.01); *B32B 2439/66* (2013.01); *Y10T 156/108* (2015.01); *Y10T 156/1064* (2015.01); *Y10T 156/1069* (2015.01); *Y10T 156/1075* (2015.01); *Y10T 156/1077* (2015.01); *Y10T 156/1082* (2015.01); *Y10T 156/1084* (2015.01); *Y10T 156/1085* (2015.01); *Y10T 156/1087* (2015.01)

(58) Field of Classification Search
  CPC ... B32B 37/085; B32B 38/0036; B32B 38/04; B32B 38/105; B32B 2038/045; B32B 2307/75; B32B 2439/66; B29C 48/0022; B29C 48/08; B29C 2793/0054; B29C 2793/0072; B29K 2101/12; B29L 2007/008; Y10T 156/1064; Y10T 156/1084; Y10T 156/1069; Y10T 156/1075; Y10T 156/108; Y10T 156/1077; Y10T 156/1087; Y10T 156/1082; Y10T 156/1085
  See application file for complete search history.

(56) References Cited

U.S. PATENT DOCUMENTS 7,942,991 B1    5/2011   Loen et al.
9,186,875 B1   11/2015   Loen et al.

FOREIGN PATENT DOCUMENTS

JP    H06182954 A    7/1994
JP    H10151701 A    6/1998

OTHER PUBLICATIONS

International Search Report and Written Opinion dated Feb. 12, 2019 for PCT/EP2018/083547 to Tata Steel Ijmuiden B.V. filed Dec. 4, 2018,; 8 pages.

* cited by examiner

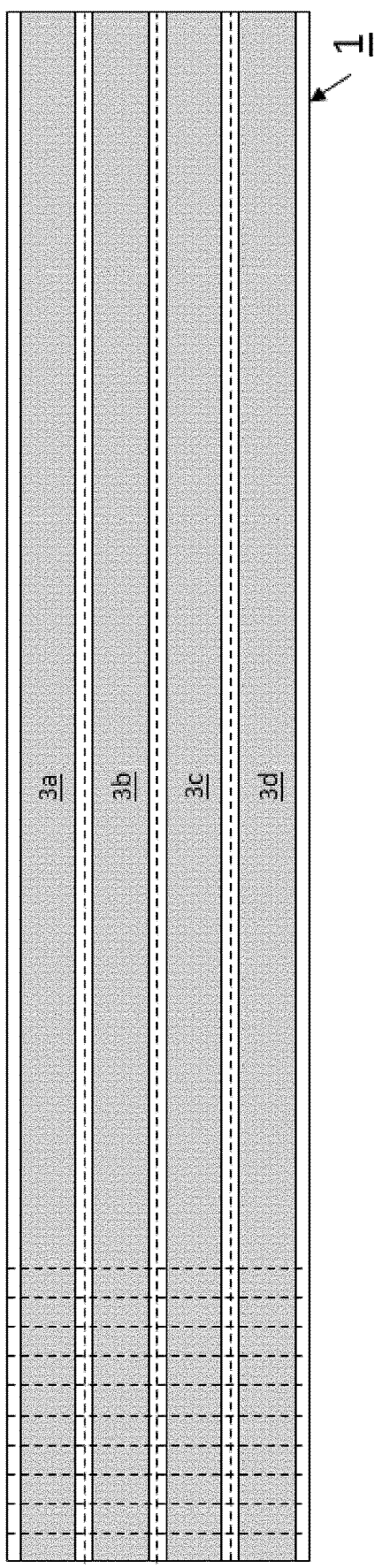
FIGURE 3
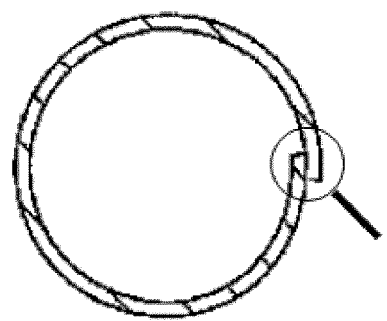
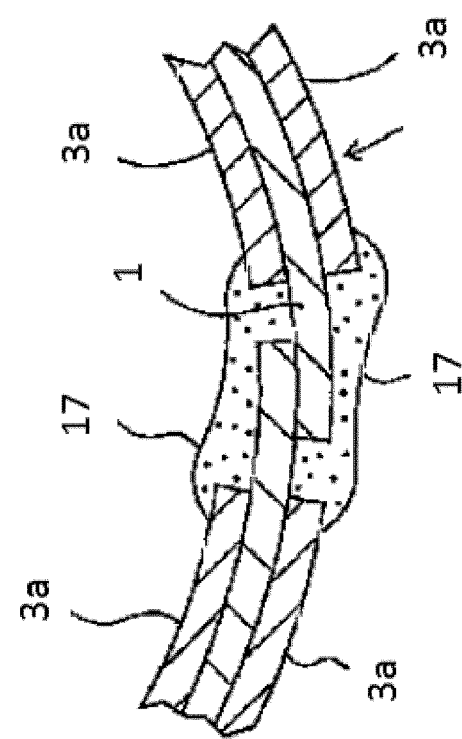
FIGURE 6

METHOD FOR PRODUCING POLYMER COATED STEEL SHEET FOR 3-PIECE CANS AND USE THEREOF

CROSS-REFERENCE TO RELATED APPLICATIONS

This is a § 371 National Stage Application of International Application No. PCT/EP2018/083547 filed on Dec. 4, 2018, claiming the priority of European Patent Application No. 17205570.9 filed on Dec. 5, 2017.

FIELD OF THE INVENTION

This invention relates to method for producing polymer coated steel sheet for 3-piece cans and 3-piece cans produced thereof.

BACKGROUND OF THE INVENTION 3-piece cans consist of three major components: a bottom lid, a body and a top lid. The top lid may be an easy open end or a conventional lid openable with a can opener, or it may be a lid for a paint can (which may consist of a ring and a lid), etc.

The body of the can may be cylindrical, square, rectangular or otherwise. The body is produced from a single piece of metal sheet, usually tinplate, brought into the right shape, e.g. a cylinder, and subsequently welded at the edges to produce a tube. The bottom lid is then seamed onto the body. Beads may be provided on the can body to increase the strength of the can. These semi-finished cans are then shipped to a filler who fills the can with its intended content and closes the can with the top lid.

The welding of the single sheet to produce a tubular can body is critical in this process. Tinplate, which is a steel substrate provided with a tin layer on either side, is mostly used as it is both corrosion resistant and weldable. However, increased pressure on tin resources and the resulting increase in tin prices has resulted in a desire to reduce the amount of tin on either side of the steel substrate. This can be done by using a different thickness of tin layer on either side of the can, by reducing the tin layer thickness depending on the future contents, or by protecting a thin tin layer with an additional coating. In most cases a lacquer is used as additional coating. Concerns about BPA have increased the desire to limit lacquer use in canmaking.

A problem with these additional coatings is that these coatings are usually not weldable and need to be removed from the area to be welded prior to welding. This additional process step is undesirable.

JPH06182954 discloses a method in which biaxially oriented PET film to be laminated onto a steel panel is slit into polymer strips and subsequently heated so that the slits open up as a result of the shrinkage of the film. The individual polymer strips are subsequently laminated onto a metal panel wherein the width of the bare material is determined by the degree of shrinkage of the film.

GB2265568 discloses a biaxially oriented PET film is coated in advance on one side with a thermosetting clear varnish of an acrylic acid resin and dried. The other side of the film is provided with three lanes of repetitive images of a print for a can body, said lanes extending in the length direction of the film, by means of a multi-colour printing to be done by using a known gravure printer. These lanes of printed portions, each with a width of 162 mm, are provided on the film with two 4-mm wide non-printed portions B provided between each adjacent lane of printed portions A. In the last step of the printing, the entire surface of the printed side of the film is coated by a gravure roller with an adhesive such as one which is mainly composed of a polyurethane resin, an acrylic acid resin or a polyester resin, each being a resin component of an ink, and then dried. Just before laminating the printed strips onto a coiled metal sheet the unprinted strips are cut out and removed, leaving a narrow strip of sheet uncoated.

The disadvantage of the method according to JPH06182954 is that the accuracy of the bare strips depends on the degree of shrinkage of the film, and therefore requires stretched material. The disadvantage of GB2265568 is that the PET film once coated still contains internal stresses because potentially resulting in shrinkage during the curing of the lacquer that covers the welded area after production of the 3-piece can body.

OBJECTIVES OF THE INVENTION

It is the object of the invention to provide a metal sheet for the production of 3-piece cans which are weldable without the need to remove this additional coating prior to welding.

It is another object of the invention to provide a metal sheet for the production of 3-piece cans with a reduced lacquer use.

It is another object of the invention to provide a metal sheet for the production of 3-piece cans with dimensionally well controlled uncoated areas.

It is another object of the invention to provide a metal sheet for the production of 3-piece cans that does not suffer from shrinkage of the coating during and after lamination.

DESCRIPTION OF THE INVENTION

One or both objects are reached with a process for manufacturing polymer coated tinplate for 3-piece can bodies comprising the steps of:
  providing tinplate in the form of a strip;
  producing one or two polymer film(s) by means of extrusion;
  slitting the extruded polymer film or films in the longitudinal direction into at least N wide polymer film strips where N is at least 2 and (N−1) narrow polymer film strips using slitting means;
  leading the narrow polymer strips away from the wide polymer strips by discharging means;
  preheating the tinplate and subsequently coating the wide polymer film strips onto the preheated tinplate by means of a nip-roll assembly to obtain a polymer coated tinplate with a plurality of polymer film strips separated spatially in the longitudinal direction by narrow strips free from said polymer film and wherein the edges of the tinplate remain free from said polymer film;
  post-heating the polymer coated tinplate in a post-heat device to a temperature above the melting point of the polymer film or films, or if the polymer film is a multilayer system, to a temperature above the melting point of that polymer film layer in the multilayer system that has the highest melting temperature;
  quenching the post-heated polymer coated tinplate.

Preferable embodiments are provided in the dependent claims.

The method according to the invention results in a tinplate strip coated with strips of polymer film produced from a wider polymer film that was produced by in-line extrusion.

In the context of this invention "in-line" is to be understood as constituting an integral part of a continuous sequence of operations. Consequently, the production of the one or two polymer film(s) and the coating of the slit wide polymer films onto the tinplate is performed in a continuous sequence of operations. For the sake of avoiding any misunderstanding, the method according to the invention does not make use of prefabricated coiled film as in JPH10151701. The method according to the invention can be performed on one side of the tinplate, thereby requiring only one extruded polymer film, or on both sides, thereby requiring two extruded polymer films. The lamination on both sides can be done simultaneously, or consecutively. The polymer film is extruded from a flat die, drawn down in a narrow gap formed between the extrusion die and the cast roll, and cast at its final desired thickness on the cast roll where it is rapidly cooled. Since the draw down to the final thickness takes place in the liquid condition, the cast film is essentially non-oriented. The extruded film is slit and the narrow polymer strips in between the wide polymer films are led away and removed. The number of wide polymer films produced from the extruded polymer film can be 2 or more. In the explanatory FIGS. 1 to 4 a number of four wide polymer films is used by means of example, but the invention works just as well with two, three or more wide polymer films. The number of narrow polymer strips cut out from between the wide polymer strips to be discharged is in principle always 1 lower than the number of wide polymer strips to be laminated onto the tinplate. The width of the extruded polymer film should be smaller than that of the tinplate to allow the edges of the tinplate to remain uncoated. If the polymer film becomes too wide for the edges of the tinplate to remain uncoated (i.e. bare) then an in-line trimming of the edges of the polymer film may be needed. These cut-off edges are led away from the polymer film and the film is coated onto the tinplate in the lamination process leaving the outermost edges of the tinplate bare from polymer. This is preferable over the alternative namely to coat the edges and grind off or otherwise remove the edges of the polymer coating after the lamination process. The leading away of the cut-off edges of the polymer film can be done by a cutting waste extraction device means such as by a sucking device. The process from extruding the polymer film from a flat die on the cast roll, followed by the slitting and lamination onto the heated tinplate is performed in one continuous operation, without interruption, i.e. in-line.

U.S. Pat. No. 9,186,875 discloses a method for laminating a metal substrate with a pre-produced biaxially oriented polymer film over the entire width. U.S. Pat. No. 9,186,875 also discloses that for multiple film coating for three piece can bodies, the films can be formed from a single film which is slit on line and the individual films are separated by gapping methods, such as by steering each film or by utilizing a bowed roll. Alternately, the wide film is pre-slit off line and the individual coils are mounted and gapped on one or more shafts. They are then fed into the laminator.

U.S. Pat. No. 7,942,991 relates to a laminating process that simultaneously creates desirable commercial products in a crystalline polyester film and discloses that multiple film widths can be applied simultaneously to the metal substrate with a gap separating them, such as for three piece can body. The films could be split from a single pre-produced film which is slit on-line and separated by gapping methods, or several films could be mounted and gapped.

The cutting means used for the slitting of the extruded polymer film may be knives, such as razor blades, or any other known cutting device such as a resistance heated wire, or a laser. As long as the slitting means are able to provide a clean cut at the running speeds of the extruder, the type of cutting means is not particularly relevant.

The narrow polymer film strips to be led away by a cutting waste extraction device means such as by a sucking device. As the polymer film is very thin (in the order of tens of micrometres) the film is also very light and the film can also be easily removed by a targeted sucking action.

After slitting the extruded polymer film and leading away the narrow polymer strips the separate two or more wide polymer films are conveyed to a nip-roll assembly where the separate two or more wide polymer films are pressed onto a preheated tinplate strip to produce a permanent bond between the tinplate and the wide polymer films. The narrow strips have to be led away after cutting to avoid fouling the lamination process in the roll-nip assembly. The slitting of the extruded polymer film and the leading away of the narrow polymer strips takes place in-line between the extrusion of the polymer film and the conveying of the resulting wide polymer films to the nip-roll assembly for subsequently coating the wide polymer film strips onto the preheated tinplate.

The direction of travel of the extruded polymer film, the resulting wide polymer films and the tinplate is the machine direction of the extruder and nip-roll combination, and as the distance between cutting device and nip-roll assembly is preferably as short as possible, the direction of travel remains unchanged and parallel to the machine direction so that the width of the gap that was made by removing the narrow polymer film strips from between the wide polymer film strips is the essentially the same as the width of the polymer free narrow strips of the polymer coated tinplate. The term essentially is used to mean that minor differences may occur as a result of vibrations or localised effects, but any resulting widening or reduction of the gap between the wide polymer films is unintended. There is no possibility to increase the gap after the slitting, e.g. as in JPH10151701. There is no room for the steering rolls and moreover it would overly complicate the process in combination with an extruder. JPH10151701 relates to the use of prefabricated coiled resin film. Moreover, with the extruded film in the invention there is a significant risk of rupture or buckling of the wide polymer film strips if the direction of travel would be changed to increase the gap.

Preferably the steel substrate is a carbon steel, preferably a low carbon steel, extra-low carbon steel, ultra low-carbon steel or a HSLA-steel. The thickness of the steel substrate is usually between 0.10 and 0.49 mm. These unalloyed (ULC, LC and ELC) or micro-alloyed (HSLA) steels are relatively cheap substrates and provide good strength and formability. The steels are produced by means of commonly known processes such as casting, hot-rolling and cold-rolling. Low carbon steels typically comprise 0.05 to 0.15 wt. % C and extra low carbon steels typically comprise 0.02 to 0.05 wt. % C. Ultra Low Carbon steels comprise typically below 0.01 wt. % C. Other elements may be present in addition to carbon in accordance with EN 10020-2000 which prescribes how much of a certain element may be present to still be considered unalloyed steel.

The tinplate is preheated to a certain temperature, preferably of at least 190° C., prior to entering the nip-roll assembly and meeting up with the wide polymer film strips to ensure a good adhesion of the polymer to the tinplate. The actual temperature of the preheated tinplate depends on the polymer to be laminated onto it, and also on the thickness of the tinplate, because a thinner tinplate will contain less heat to provide the thermal bonding of the polymer layer to the tinplate. So a thinner tinplate will have to be reheated to a higher temperature for this reason. The melting point of tin (~232° C.) limits the preheat to 230° C. Here it is very important to note again that it is deemed crucial to the invention that the polymer film that is produced by the extrusion process is essentially non-oriented. Unlike many commercial polymer films used in metal lamination processes, the polymer film in the present invention is not uniaxially or biaxially oriented and therefore the polymer film will not shrink when heated by the preheated tinplate or during the lamination in the roll-nip assembly. The small amount of tension needed to guide the extruded polymer film and the wide polymer films after cutting from extrusion to lamination is not deemed to be stretching as this stretching is essentially elastic. This means that the gap between the wide polymer strips is not produced by the uncontrolled process of cutting and growing the gap by shrinkage as in JPH06182954. A big advantage is that the adhesion of the polymer film to the tinplate is much better. It also prevents any shrinkage of the film during the curing of the lacquered weld after forming the can body for the 3-piece can.

The welding of the 3-piece can body takes place on the uncoated tinplate edges of the blank (see FIG. 6, where 1 is the uncoated tinplate, 3a is the polymer coating, and 17 is the lacquer applied to the weld) thereby forming the so-called side-seam. The exposure metal in the side-seam needs to be covered by the application of a suitable protective lacquer, and this process is termed side striping. The lacquer 17 needs to be cured, usually at elevated temperatures and shrinkage of the film is prevented using a polymer coated blank according to the invention as a result of the polymer film being unstretched and therefore unoriented. Moreover, the growing of the gap by using the shrinkage of the polymer film is not as consistent as the cutting and leading away of the narrow polymer film strips, so the dimensional stability of the process according to the invention is much better.

After laminating the wide polymer film strips onto the tinplate in the roll-nip assembly the polymer coated tinplate is post-heated in a post-heat device to a temperature above the melting point of the polymer film or films, or if the polymer film is a multilayer system, to a temperature above the melting point of that polymer film layer in the multilayer system that has the highest melting temperature. After this the polymer coated tinplate is immediately quenched at a sufficiently high cooling rate and to a temperature which is sufficiently low to suppress crystallisation as much as possible, preferably to completely suppress crystallisation. A water quench is adequate and often used. For most polyesters a quench temperature of below 50° C. is a good guideline. Below the glass temperature (Tg) the polymer chains are no longer mobile. A value of 50° C. is below the glass temperature of most aromatic (co)polyesters. Polyolefins have a much lower Tg, even below 0° C., so here the issue is to suppress crystallisation as much as possible and in particular avoid the growth of large (spherulitic) crystals. The cooling rate achieved in such a quench is not particularly critical, as long as it is fast enough, and a suitable values is between about 50 to 300° C./s, e.g. about 100° C./s. The required preheat and post-heat temperature and the cooling rate and cooling temperature depends on the type of polymer used and can be easily determined on the basis of the above. The post-heat temperature is preferably at least 235° C., but in any case the post-heat temperature is a temperature above the melting point of the polymer film or films, or if the polymer film is a multilayer system, to a temperature above the melting point of that polymer film layer in the multilayer system that has the highest melting temperature. If the polymers on both sides of the strip are not the same, then the highest melting temperature determines the post-heat temperature. It is essential that all polymers are heated above the melting temperature.

If the post-heat temperature is above the melting point of tin the resulting tin layer will become alloyed with iron from the steel. This process is quite similar to the normal alloying occurring during flow-melting of tinplate and it improves the adhesion of the tinplate layer to the steel and the adhesion of the polymer to the tin or tin-alloy layer.

The polymer films coatings that can be produced by the process according to the invention are preferably based on polyesters, co-polyesters (including PET, PBT), blends of polyesters, e.g. PET:PBT blends, polyamides, polyolefins, elastomers, or any other polymer that can be formed in a film by extrusion. The polymer coating may consist of one or more layers.

In a preferred embodiment the polymer films comprise or consist of a thermoplastic polymer with a melting point above 200° C. Examples of these coating layers comprise or consist of an aromatic polyester, such as poly(ethylene terephthalate), poly(trimethylene terephthalate), poly(butylene terephthalate), poly(ethylene naphthalate) and poly (butylene naphthalate); acid-modified poly(ethylene terephthalate) copolyesters comprising isophthalate; glycol-modified poly(ethylene terephthalate) copolyesters comprising cyclohexanedimethanol, 2,2,4,4-tetramethyl-1, 3-cyclobutanediol or isosorbide; and blends comprising two or more of the above listed homo- or copolymers. Further examples of the coating layers having a melting point above 200° C. comprise or consist of certain polyamides, including polycaprolactam (polyamide-6), poly(hexamethylene adipamide) (polyamide-6,6), poly(tetramethylene adipamide) (polyamide-4,6), poly(hexamethylene dodecanoamide) (polyamide-6,12), poly(m-xylylene adipamide) (MXD6), and blends thereof.

BRIEF DESCRIPTION OF THE DRAWINGS

The invention will now be further illustrated by reference to the following drawings.

FIG. 3 (not to scale) shows schematically how the polymer coated tinplate could be slit lengthwise into four narrow polymer coated tinplate strips, and also (on the left hand side) how individual blanks could be produced from the polymer coated tinplate or the narrow polymer coated tinplate strips. These blanks have edges which are free from polymer, and are thus weldable to produce a 3-piece can body.

FIG. 4B shows that 8a is wider than 11a, etc. so that the polymer free parts depicted in FIG. 2 and indicated with 9a-9c are different in width on either side of the strip. Also 8a and 11a may have the same width. But they may be shifted in respect to the other (FIG. 4C).

Figure 1:
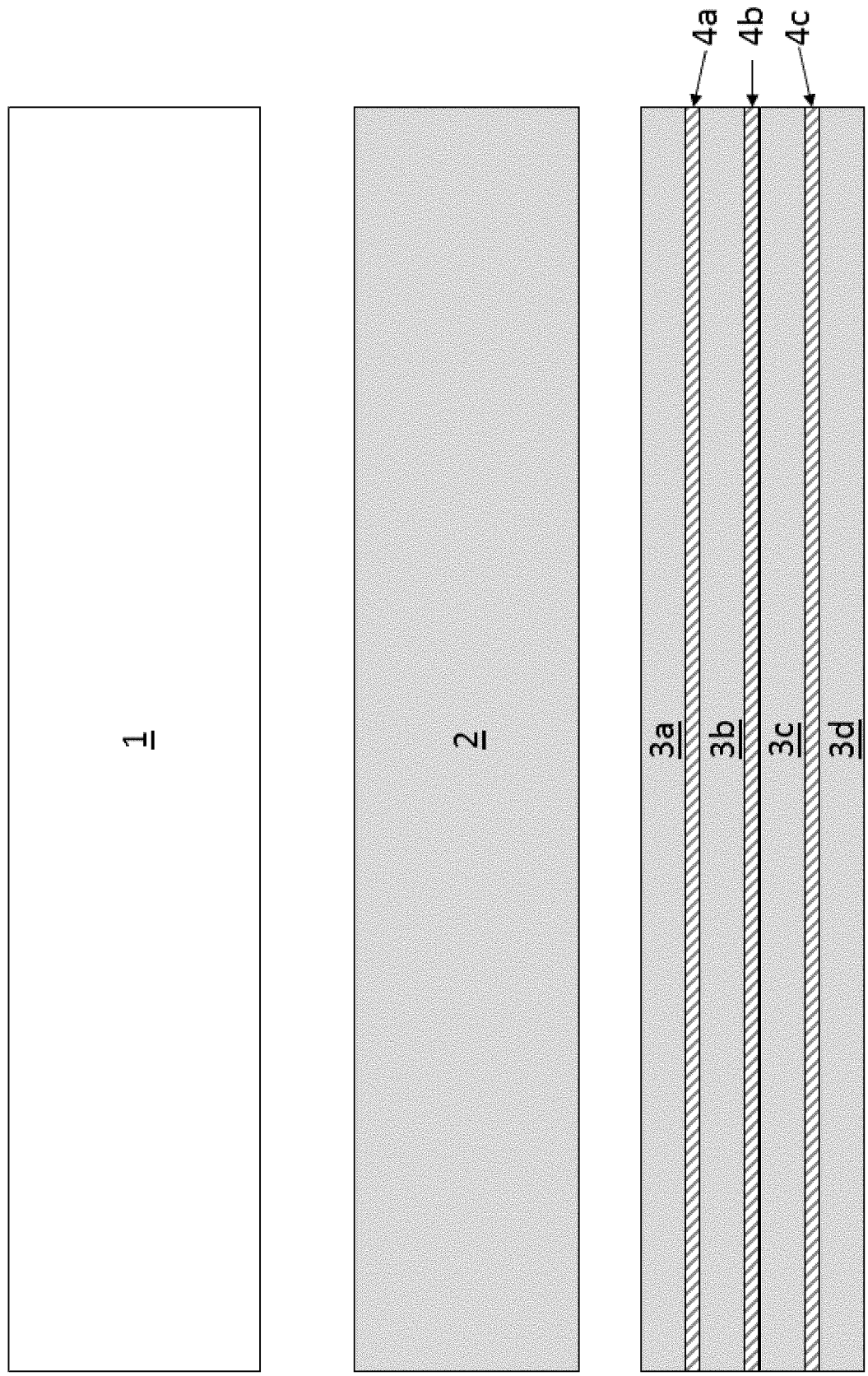
FIG. 1 (not to scale) shows the tinplate 1, the polymer film 2, and the polymer film slit into four wide strips (3a-3d) and three narrow strips (4a-4c) which are removed so that only the wide strips (3a-3d) remain for further processing in the coating line.
Figure 2:
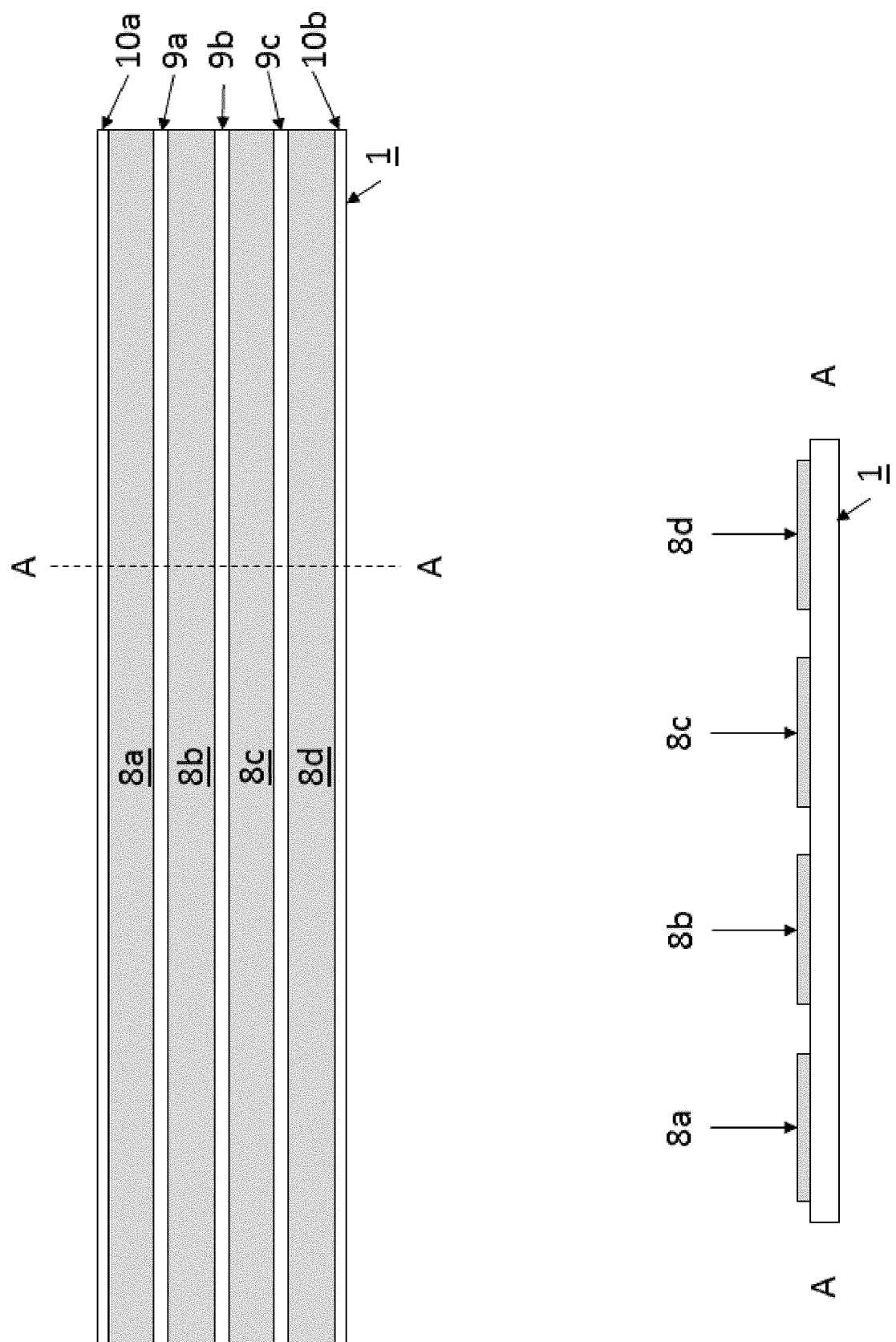
FIG. 2 (not to scale) shows the tinplate coated with the four wide strips (8a-8d) which have been laminated onto the tinplate, post-heated and quenched. The polymer film strips (8a-8d) are in an amorphous state. Below a cross section is depicted over the line A-A showing the tinplate and the four wide strips (8a-8d) as well as the polymer free edges (10a-10b) and the polymer free narrow strips (9a-9c).
Figure 4A:
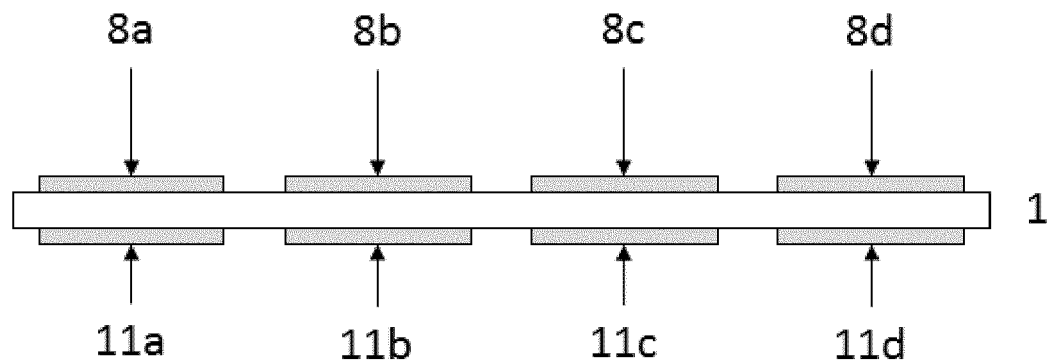
FIGS. 4A-4C (not to scale) show a cross section over the line A-A showing the polymer coated tinplate when coated on both sides with four wide strips. Note that in this drawing the wide polymer film strips are positioned symmetrically in relation to the centre line of the tinplate. In principle it is possible to have a degree of asymmetry in this positioning depending on the blank size, can body and body maker. The wide polymer strips need not have the same width on both sides.
Figure 4B:
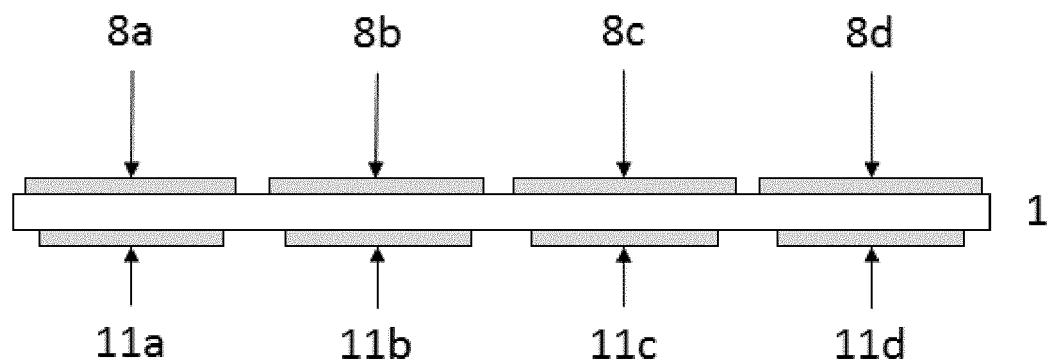
Figure 4C:
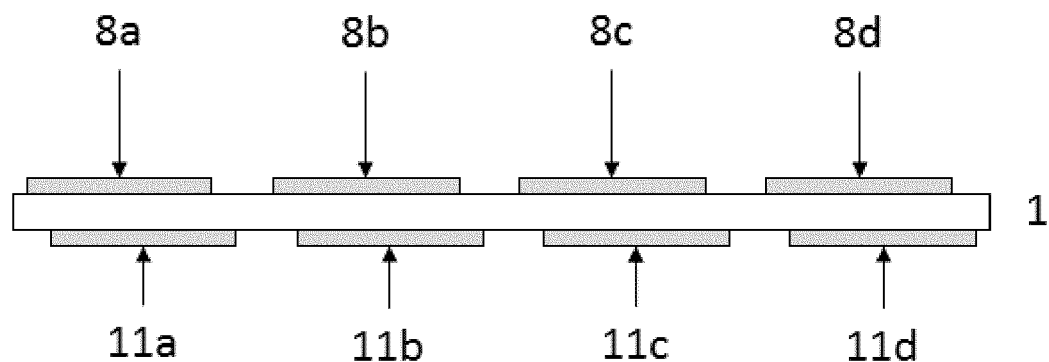
Figure 5:
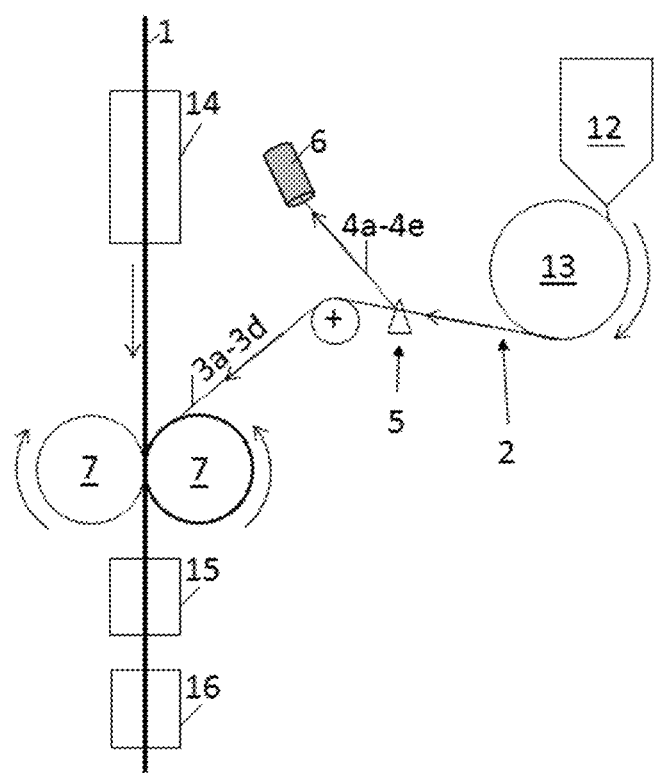
FIG. 5 shows an extruder 12 which extrudes a molten polymer onto a cooled guide roll 13 to form an extruded polymer film 2. This film is subsequently transported to cutting means 5 for slitting the extruded polymer film 2 into wide polymer film strips 3a-3d and narrow polymer film strips 4a-4c and optionally the edges 4d, 4e of the extruded polymer film. These narrow polymer film strips and optionally the edges are led away and removed by means of the cutting waste extraction device 6. The wide polymer film strips 3a-3d travel further to the two rolls 7 who are positioned such that a nip exists between the two rolls through which a preheated tinplate 1 is led along with the narrow polymer film strips. The tinplate is preheated in heating device 14 and by a pressing action of the two rolls the wide polymer film strips 3a-3d are laminated onto the tinplate and fixedly bonded thereto by this film lamination process. The polymer coated tinplate is led to a post-heat device 15 where the polymer coated tinplate is heated to above at least the melting point of the polymer film or films, or if the polymer film is a multilayer system, to a temperature above the melting point of that polymer film layer in the multilayer system that has the highest melting temperature, and subsequently quenched in quenching device 16. After quenching the polymer coated tinplate is coiled and ready for further processing into 3-piece can bodies. The heating device 14 works on the basis of induction, heated guide rolls, hot air or otherwise.

The device depicted in FIG. 5 is a one-sided lamination. However, the device can be easily made symmetrical so that polymer coating on both sides can occur simultaneously. It is noted that the device in FIG. 5 is a schematic drawing, and that the dimensions are not intended to be accurate. For instance, the cutting means 5 are positioned close to the lamination roll, and the distance the wide polymer strips travel after removing the narrow polymer strips is as short as possible to prevent dimensional inaccuracies. As soon as the narrow strips and optional edge cuts 4a-4e are cut they are led away to the cutting waste extraction device 6 to prevent any disturbance of the lamination process.

FIG. 6 shows a cross-section of a welded 3-piece can body and the left hand side of the figure shows an enlarged portion of the welded portion. The bare tinplate edges are clearly shown as well as the edges of the wide polymer film strip 3a and the portion where the two bare edges are bonded together by welding. The welded and bare metal is subsequently covered with a lacquer 17 to protect the metal against corrosion. The lacquer is preferably BPA-free.

EXAMPLES

Example 1: A tinplate 1 with a thickness of 0.20 mm is heated to a temperature of 230° C. by means of heating device 14. A polymer film (PET) is extruded via nozzle 12, on a guide roll 13. The cooled extruded polymer film 2 is then conveyed to the preferably rubber coated contact roll 7. As it travels it is possible to monitor the thickness, colour and strip tension and to trim to the correct width. Cutting devices 5 slit the film into wide polymer film strips 3a-3d and narrow polymer film strips 4a-4c as cut of the edges 4d, 4e, which are removed by suction through 6. The thickness of the extruded polymer film is around 30 µm. The polymer film strips are coated onto the preheated tinplate by pressing the polymer onto the tinplate in the nip between the two rolls 7. The rubber of these rolls is cooled externally, for example by metal cooling roll, or by an air-blade on the rubber surface. The coated strip is then subjected to a brief extra heat treatment to 260° C. in order to optimise adhesion. A good product results, particularly suitable for example for the covers of three-piece cans.

Example 2: An ETP strip was coated with 2.0 g/m² tin on both sides and subjected to 311 passivation treatment. The strip was coated with a polymer coating which will become the internal coating of the can body and another coating on the other side (external coating). The internal coating consisted of a 4 µm adhesion layer, a 12 µm middle layer and a 4 µm top layer, all three layers consisting of blends of PET or co-polymers of PET. The external coating consisted of a 4 µm adhesion layer, a 12 µm middle layer and a 4 µm top layer, all three layers consisting of blends of PET and PBT. During the coating process 2 narrow polymer film strips with a width of 5 mm were removed and the edges were removed so that 10 mm edges of the tinplate were bare. Three polymer coated strips of ETP with a width of 310 mm were obtained. From these strips can bodies can be produced.

Typical recipes for polymer films consisting of three sublayers for use in the process according to the invention are given below. In the Examples below, five different types of polyester resin were used to produce different types of polyester sublayers:

IPA-PET: poly(ethylene terephthalate) copolymer in which about 3 mole % of terephthalic acid monomer units has been replaced with isophthalic acid monomer units PETg: poly(ethylene terephthalate) copolymer in which about 30 mole % of ethylene glycol monomer units has been replaced with cyclohexane-dimethanol monomer units PBT: poly(butylene terephthalate) homopolymer $TiO_2$ MB: a 50/50 weight % mixture of $TiO_2$ and CHDM-PET

TABLE 1

Polyester film recipes (typical dimensions are 4:12:4 µm, total 20 µm)

| Code | Adhesion layer | Main layer or barrier layer | Top layer |
| --- | --- | --- | --- |
| B | 70% PETg 30% IPA-PET | 100% IPA-PET | 100% IPA-PET |
| C | 70% PETg 30% IPA-PET | 67% IPA-PET 33% TiO2 MB | 100% IPA-PET |
| D | 100% IPA-PET | 67% IPA-PET 33% TiO2 MB | 70% PETg 30% IPA-PET |
| E | 75% IPA-PET 25% PBT | 75% IPA-PET 25% PBT | 75% IPA-PET 25% PBT |

Another example of a polymer film is comprises, or consists only of an inner layer comprising a combination of PET and modified PET (IPA-PET), as adhesion layer, a layer consisting of a blend and/or copolymer of PET and PBT as a main layer or barrier layer and an outer (top) layer comprising PET, modified PET or a PET: PBT blend.

Known blends of PET and PBT can be used. Ratios of 25:70 PBT and 30:75% of PET are common nowadays.

To the expert it will be clear that the invention can be applied for single-side or two-side coating of a metallic substrate with on each side the same polymer layer, or a different polymer layer for example coating system A on one side and coating system E on the other side.

The invention claimed is:

1. A method for manufacturing polymer coated tinplate for 3-piece can bodies comprising the steps of:
   providing a tinplate in the form of a strip;
   producing one or two polymer films by means of in-line extrusion forming an in-line extruded polymer film or films using an extruder;
   slitting the in-line extruded polymer film or films in a longitudinal direction into at least N separate wide polymer film strips where N is two or more and (N-1) narrow polymer film strips cut out from between the separate wide polymer film strips using slitting means;
   in-line trimming of edges of the in-line extruded polymer film or films to produce cut-off edges and to ensure that a width of the in-line extruded polymer film or films is smaller than a width of the tinplate in the form of a strip to enable edges of the polymer coated tinplate to be free from said in-line extruded polymer film or films;
   leading the narrow polymer film strips, and the cut-off edges, away from the wide polymer film strips;
   conveying the separate two or more wide polymer film strips to a nip-roll assembly;
   preheating the tinplate in the form of a strip to form a preheated tinplate and subsequently coating the separate two or more wide polymer film strips onto the preheated tinplate by means of the nip-roll assembly to obtain a polymer coated tinplate with the separate two or more wide polymer film strips separated spatially in a longitudinal direction by narrow strips free from said in-line extruded polymer film or films and wherein edges of the polymer coated tinplate remain free from said in-line extruded polymer film or films;
   post-heating the polymer coated tinplate to a post-heat treatment temperature above the melting point of the in-line extruded polymer film or films, or if the in-line extruded polymer film or films is a multilayer system, to a temperature above the melting point of a polymer film layer in the multilayer system that has the highest melting temperature forming a post-heated polymer coated tinplate;
   quenching the post-heated polymer coated tinplate forming a quenched polymer coated tinplate.

2. The method according to claim 1, wherein the tinplate in the form of a strip is preheated to at least 190° C. prior to entering the nip-roll assembly.

3. The method according to claim 1, wherein the quenched polymer coated tinplate is slit into a plurality of strips wherein the slitting is performed in the longitudinal direction and in the narrow strips free from said in-line extruded polymer film or films.

4. The method according claim 1, wherein blanks for producing the 3-piece can bodies are produced from the quenched polymer coated tinplate.

5. The method according to claim 1, wherein the in-line extruded polymer film or films comprises polyamides, polyolefins, polyesters, co-polyesters, or blends of polyesters.

6. The method according to claim 1, wherein the in-line extruded polymer film or films has a thickness of between 5 and 35 µm.

7. The method according to claim 1, wherein the in-line extruded polymer film or films produced by the in-line extrusion is essentially non-oriented.

8. The method according to claim 1, wherein a direction of travel of the in-line extruded polymer film or films, the wide polymer film strips and the tinplate in the form of a strip is a machine direction of the extruder and nip-roll assembly and wherein the direction of travel remains unchanged and parallel to the machine direction so that a width of a gap, that was made by removing the narrow polymer film strips cut out from between the separate wide polymer film strips, is the same as a width of the narrow strips free from said in-line extruded polymer film or films of the polymer coated tinplate.

9. The method according to claim 1, said tinplate in the form of a strip comprising a steel substrate and a tin layer on either side, wherein the post-heat treatment temperature is above the melting point of the tin layer to achieve that the tin layer will become alloyed with iron from the steel substrate to result in a tin-alloy layer to improve adhesion of the tin layer to the steel substrate and adhesion of the separate two or more wide polymer film strips to the tin-alloy layer.

10. The method according to claim 9, wherein the post-heat treatment temperature is at least 235° C.

11. The method according to claim 1, wherein the in-line extruded polymer film or films is not uniaxially or biaxially oriented and therefore will not shrink when heated by the preheated tinplate or during lamination in the roll-nip assembly.

* * * * *